US012246435B2

(12) United States Patent
Regmi et al.

(10) Patent No.: US 12,246,435 B2
(45) Date of Patent: Mar. 11, 2025

(54) MOBILE ROBOT CONFIGURED TO DETERMINE HUMAN ARM STIFFNESS DURING OVERGROUND INTERACTION

(71) Applicant: The Curators of the University of Missouri, Columbia, MO (US)

(72) Inventors: Sambad Regmi, Rolla, MO (US); Yun Seong Song, St. Louis, MO (US)

(73) Assignee: The Curators of the University of Missouri, Columbia, MO (US)

( * ) Notice: Subject to any disclaimer, the term of this patent is extended or adjusted under 35 U.S.C. 154(b) by 398 days.

(21) Appl. No.: 17/939,698

(22) Filed: Sep. 7, 2022

(65) Prior Publication Data

US 2023/0072201 A1  Mar. 9, 2023

Related U.S. Application Data

(60) Provisional application No. 63/241,709, filed on Sep. 8, 2021.

(51) Int. Cl.
| | |
|---|---|
| B25J 13/08 | (2006.01) |
| B25J 5/00 | (2006.01) |
| B25J 9/16 | (2006.01) |
| B25J 11/00 | (2006.01) |

(52) U.S. Cl.
CPC ............ B25J 13/085 (2013.01); B25J 5/007 (2013.01); B25J 9/1633 (2013.01); B25J 11/009 (2013.01)

(58) Field of Classification Search
CPC ........ B25J 13/085; B25J 5/007; B25J 9/1633; B25J 11/009; B25J 9/107; B25J 11/008; A61H 2003/043; A61H 3/04; A61H 2201/1215; A61H 2201/1635; A61H 2201/1659; A61H 2201/5061; A61H 2230/605

See application file for complete search history.

(56) References Cited

PUBLICATIONS

Regmi et al., "Estimation of Endpoint Impedance of a 2D Parallel Manipulator Using Numerical Simulation Experiments," Proceedings of the ASME 2020, International Mechanical Engineering Congress and Exposition, Nov. 15-19, 2020, Portland, OR, USA, IMECE2020-23419, pp. 1-7.

(Continued)

*Primary Examiner* — Bhavesh V Amin
(74) *Attorney, Agent, or Firm* — HOVEY WILLIAMS LLP

(57) ABSTRACT

A mobile robot system and method for determining the stiffness of a human arm while moving with a user during overground interaction as the user holds the robot's handle and exchanges forces with it. A mobile base moves with the user, a robot arm interacts with the user, and a controller determines the stiffness. The robot arm includes servomotors driving a linkage mechanism, an end effector including the handle supported by the linkage mechanism, and a force transducer measuring a force applied by the user to the handle. The controller causes the robot arm to generate a force perturbation at the handle, measure a peak velocity achieved by the human arm, determine the stiffness of the human arm as a function of force and displacement, and control operation of the system based on the determined stiffness. A robot body may allow for adjusting the height of the robot arm.

18 Claims, 5 Drawing Sheets

(56) References Cited

PUBLICATIONS

Regmi et al., "Design Methodology for Robotic Manipulator for Overground Physical Interaction Tasks," Journal of Mechanisms and Robotics, Transactions of the ASME, vol. 12, published online Dec. 12, 2019, 041002-1-041002-8.

Regmi et al., "Design Methods for Robots for Overground Physical Interaction," Missouri University of Science and Technology, Jul. 24, 2019, IEEE EMBC Berlin, 1 page poster.

Hasner, V., "Career Award funds research on human-robot interaction," Missouri University of Science and Technology eConnection, posted May 4, 2021, econnection.mst.edu, 7 pages.

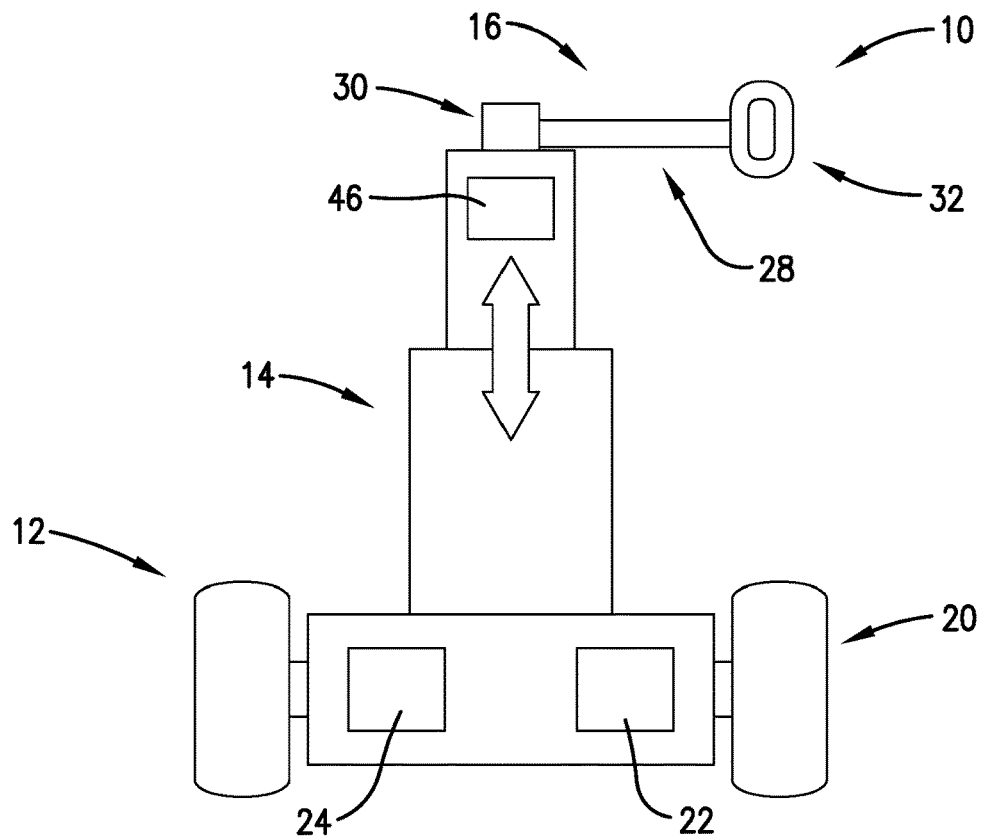
Fig. 2.
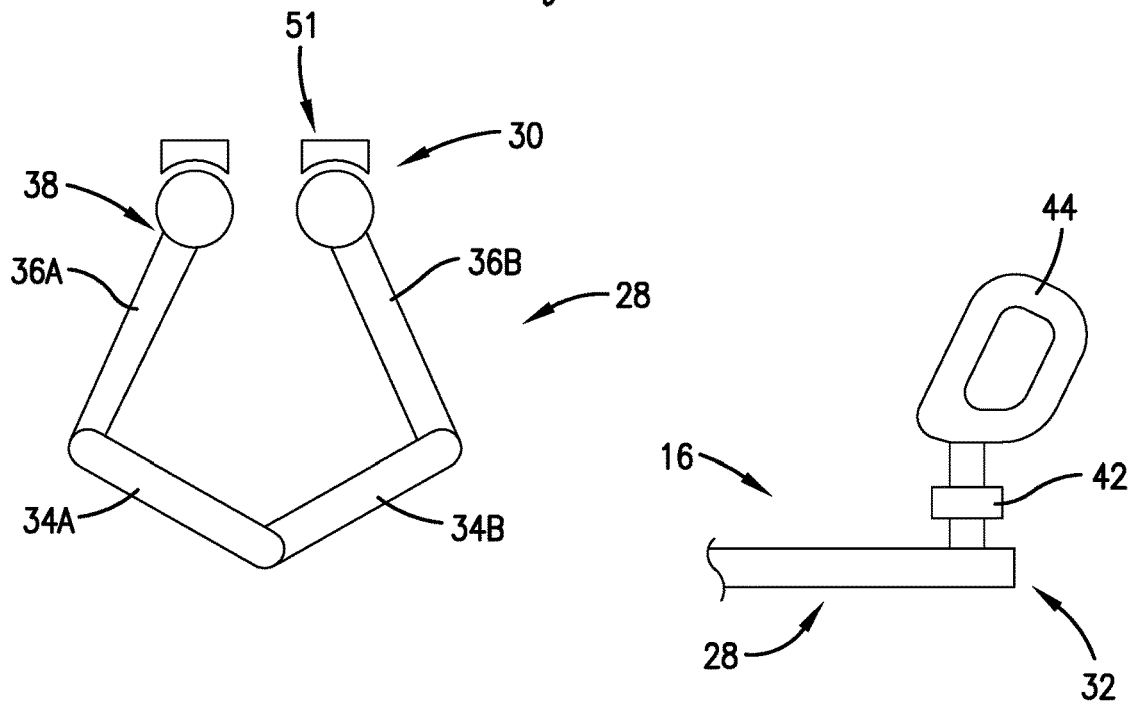
Fig. 3.
Fig. 4.

MOBILE ROBOT CONFIGURED TO DETERMINE HUMAN ARM STIFFNESS DURING OVERGROUND INTERACTION

RELATED APPLICATION

The present U.S. non-provisional patent application is related to and claims priority benefit of an earlier-filed U.S. provisional patent application titled MOBILE ROBOT FOR OVERGROUND PHYSICAL HUMAN-ROBOT INTERACTION, Ser. No. 63/241,709, filed Sep. 8, 2021. The entire content of the identified prior-filed application is incorporated by reference into the present application as if fully set forth herein.

FEDERALLY SPONSORED RESEARCH

This invention was made with government support under Contract Nos. 1843892 and 2046552 awarded by the National Science Foundation. The government has certain rights in the invention.

FIELD

The present invention relates to robotic systems and methods for interacting with humans, and more particularly, embodiments concern a mobile robot system and method configured to determine the stiffness of a human arm during overground interaction and use the determined stiffness to control the robot and manage the interaction.

BACKGROUND

Physical human-robot interaction (pHRI) applications, such as assistance walking, benefit from humans and robots being better able to communicate and interpret each other's intentions more intuitively and effectively. One way humans communicate is through the modulation of arm stiffness. Stiffness, or impedance, measurements generally involve introducing a perturbation and noting the human user's response. Two types of perturbations, force and position, are commonly used. Position perturbation has been used for estimating arm stiffness in pHRI, and using position perturbation while maintaining an arm posture is generally straightforward to implement. The human user's hand is perturbed with a predefined displacement, restoring forces are measured, and stiffness is calculated as the ratio of force to displacement in a window in which the change in displacement, or velocity, is approximately zero. Position perturbation can also be used during movement as long as the non-perturbed trajectory is provided. However, in an overground application, predicting the unperturbed trajectory of the human arm or hand can be very difficult due to the variability of the human movement while walking alongside the robot.

Force perturbation has also been used for estimating arm stiffness in pHRI. The conventional force perturbation method employs continuous perturbations with rich frequency components. One solution uses pseudo-random binary sequence force inputs continuously for the entire period of the trial to estimate the joint mechanical properties in limb motion tasks, and uses multiple repeated trials while estimating the impedance parameters. In another solution, time-frequency analysis is performed using force pulse to measure arm stiffness, which eliminates the requirement for multiple trials but not for repeated perturbations. One solution involving time-frequency analysis uses the estimates of body segment parameters which requires a rich understanding of the inertial characteristics of the arm, while another solution uses a parametric and a non-parametric estimator to estimate continuous-time linear time-varying system of the arm dynamics. However, all of these solutions require continuous mechanical perturbation which can interfere with an effective interaction during overground tasks.

SUMMARY

Embodiments address the above-described and other problems and limitations in the prior art by providing an improved mobile robot system and method configured to better determine the stiffness, or impedance, of a human arm during overground interaction as a human user grasps the robot and exchanges forces with it as if it was a human partner.

In an embodiment of the present invention, a mobile robot system may comprise a mobile base configured to move with a human user, a robot arm coupled with the mobile base and configured to physically interact with the human user, and a controller. The robot arm may further include at least one servomotor, a linkage mechanism coupled with and driven by the servomotor, an end effector including a handle physically supported by the linkage mechanism and configured to be grasped by the human user, and a force transducer coupled with the end effector and configured to measure a force applied by the human user to the handle. The controller may be configured to determine a stiffness of the human arm of the human user at a particular time by generating a single force perturbation at the handle of at least approximately one Newton in a direction (for example, toward the human user), measuring a displacement of the human arm and measuring a peak velocity achieved by the human arm during the single force perturbation, determining the stiffness of the human arm as a function of the single force perturbation and the displacement of the human arm, and then control operation of the mobile base and robot arm, with regard to interacting with human user, based on the stiffness of the human arm.

Various implementations of the above-described embodiment may further include any one or more of the following additional features. The mobile base may include at least one wheel driven by an electric motor. The servomotor may be a brushless direct current motor configured to move the end effector at least approximately between eight-tenths and nine-tenths meters-per-second, and to move the end effector so that the end effector is able to generate a force of at least approximately between nine and eleven Newtons. There may be two servomotors, and the linkage mechanism may be a two-dimensional closed loop symmetrical five-link mechanism with two degrees of freedom and formed by two distal links, two proximal links, and a ground link coupled with and driven by the two servomotors, and the handle may be located at a joint of the two distal links. The force transducer may be a six-axis force transducer configured to measure forces to approximately seventeen Newtons, and the force transducer may be positioned at the joint of the two distal links with the handle. The controller may be further configured to provide a background stiffness of approximately between fifty Newton/meters and one hundred Newton/meters to the human user via the end effector. The system may further include a robot body extending between the mobile base and the robot arm, and the robot body may have an adjustable height allowing for adjusting a vertical position of the handle of the robot arm relative to the human user.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 2 is a cross-sectional elevation view of an embodiment of the mobile robot system of FIG. 1;

FIG. 3 is a plan view of an example arrangement of links and servomotors which are part of a robot arm component of the mobile robot system of FIG. 1;

FIG. 4 is a cross-sectional elevation view of an example arrangement of an end effector and a force transducer which are part of the robot arm component of the mobile robot system of FIG. 1;

Figure 1:
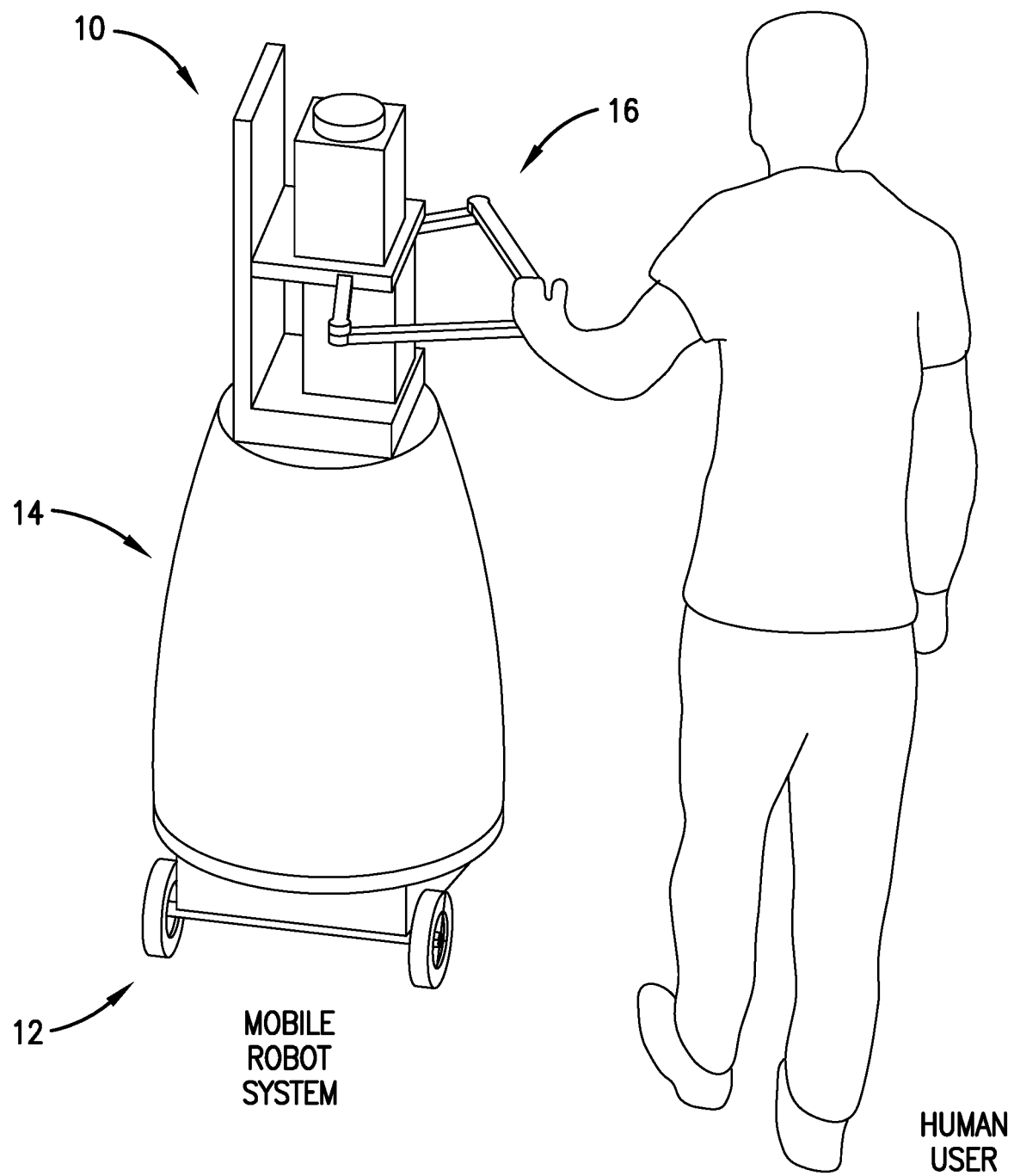
FIG. 1 is a perspective view of a depiction of an embodiment of a mobile robot system interacting with a human user, wherein the system is configured to determine the stiffness of a human arm during overground interaction as the human user grasps the robot and exchanges forces with it as if it was a human partner.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments of the present invention provide a mobile robot system and method configured to determine the stiffness of a human arm during overground interaction as a human user grasps the robot and exchanges forces with it as if it was a human partner. An embodiment of the mobile robot system may include a mobile base and a robot arm. The mobile base may support the robot arm and adjust its speed to that of the human user. The robot arm may be configured to provide a substantially natural, human-like interaction, and may include substantially low mechanical impedance, such as very low inertia and friction, as well as an ability to sense and apply precise interaction forces to the human user. In particular, the robot arm may have the ability to apply and measure small interaction forces (of, e.g., equal to or less than approximately ten Newtons) as well as inherently low endpoint impedance. In one implementation, the robot arm may include two brushless direct current (DC) motors with no gearheads and a lightweight, symmetric linkage system.

Embodiments have numerous potential applications, including in rehabilitation and physical therapies, living assistance, manufacturing, and entertainment. The ability to determine arm stiffness allows for more effective interaction, including for developing more intuitive and effective walking assistance. Embodiments use a single force perturbation rather than continuous force pulses. This avoids interfering with the continuous overground physical interaction process throughout the entire trial, and eliminates the need for baseline unperturbed trajectory. Further, embodiments use a single trial rather than multiple trials As referred to herein, "stiffness" is used in its commonly accepted sense, so a human arm is stiffer if the arm muscles are contracted and less stiff if they are not. The opposite of stiff may be referred to as "compliant," so a stiffer arm is less compliant and a less stiff arm is more compliant. Generally, stiffness can be quantified as a ratio between how much force is applied at the hand (perturbation force, F) and how much the arm moves as a result (displacement, X). The stiffness (K) is then K=F/X.

Referring to FIGS. 1-6, an embodiment of the mobile robot system 10 is shown including a mobile base 12, a robot body 14 coupled with and supported by and above the mobile base 12, and a robot arm 16 coupled with and supported by the robot body 14. The mobile base 12 may be configured to physically support the robot body and to adjust its speed to that of the human user.

In one implementation, the mobile base 12 may include at least one wheel 20, a battery or other power supply 22, and a base controller 24. For example, the mobile base 12 may be a four wheel differential drive robot, powered by a twelve Volt DC power supply through two rechargeable batteries, and controlled by a microcontroller which may receive commands from a main controller. In another implementation, the mobile base may include at least one continuous track. The mobile base 12 may be independently controlled by the base controller 22 and receive input commands for linear and angular velocity. One or more quadrature encoders (not shown) reading from the motors of the wheels 20 of the base 12 may be used for determining the instantaneous position of the mobile robot system 10, which can be used for controlling the speed of the system 10. The iteration rate for base control may be forty Hertz. Broadly, the design and operational characteristics of the mobile base 12 may depend on the nature of the interaction (e.g., leading or following) and the needs of the human user.

The robot body 14 may be configured to physically support the robot arm 16. In one implementation, the robot body 14 may have an adjustable height to allow human users with varying heights to better interact with the mobile robot system 10 without the discomfort or awkwardness that might otherwise arise from height differences.

The robot arm 16 may be configured to provide a substantially natural, human-like interaction, including having a substantially low mechanical impedance, such as a very low inertia and friction, as well as an ability to sense and apply precise forces to the human user. In one implementation, the robot arm 16 may include two or more links 28 driven by two or more servomotors 30, and an end effector 32 supported by the links 28. For example, the robot arm 16 may be a two-dimensional closed loop symmetrical five-link mechanism with two degrees or freedom and include two distal links 34A,34B, two proximal links 36A,36B, and a ground link 38, with the two servomotors 30 being positioned on either side of the ground link 38. For a given offset between the servomotors 30, the lengths of the links 28 may be determined using the method of inequality, sufficiently avoiding singularities while covering a desired work area. For example, the links 28 may be configured to be symmetrical and have the shortest length while still allowing the end effector 32 to cover the entire work area, thereby resulting in a low intrinsic mechanical impedance.

The servomotors 30 may be substantially any suitable electric motors. For example, the servomotors 30 may be brushless DC motors, configured such that the endpoint speed of the end effector 32 is approximately between one-half and one and one-half meters-per-second, and configured such that the end effector 32 is able to generate a force of at least approximately ten Newtons at every point in the work area. Each servomotor 30 may be associated with a servo drive 50, an encoder 51 configured to measure angular displacement, and a controller, which may be a main real-time controller 52. The servo drives 50 and the force/torque controller 54 may be alternating current (AC) powered, whereas the main controller 52 may use a twenty-four Volt DC power supply through an AC-to-DC converter. Two additional twenty-four Volt power supply modules may be used to provide the logic power to the servo drives 50. Each encoder 51 may be a single-ended high resolution optical encoder configured to precisely measure angular displacement up to seven thousand two hundred counts-per-rotation.

The end effector 32 may be configured to cover the desired range of motion and to follow movement of the human user's hand across the work area. The robot arm 16 may further include force/torque transducer 42 and force/torque controller 54 configured to measure at the end effector 32. In one example implementation, the transducer 42 may be six-axis force transducer configured to precisely measure forces approximately up to seventeen Newtons. The force/torque transducer 42 may be positioned on the joint of two distal links 34A,34B.

As seen in FIG. 4, the robot arm 16 may further include an interaction handle 44 located on top of the transducer 42. The handle 44 may have substantially any suitable form. In various implementations, the handle may provide a relatively short grip for accommodating one of the human user's hands, two relatively short grips for accommodating both hands, or one relatively long grip. Further, the grip may be shaped or otherwise configured to resemble a human hand.

Figure 5:
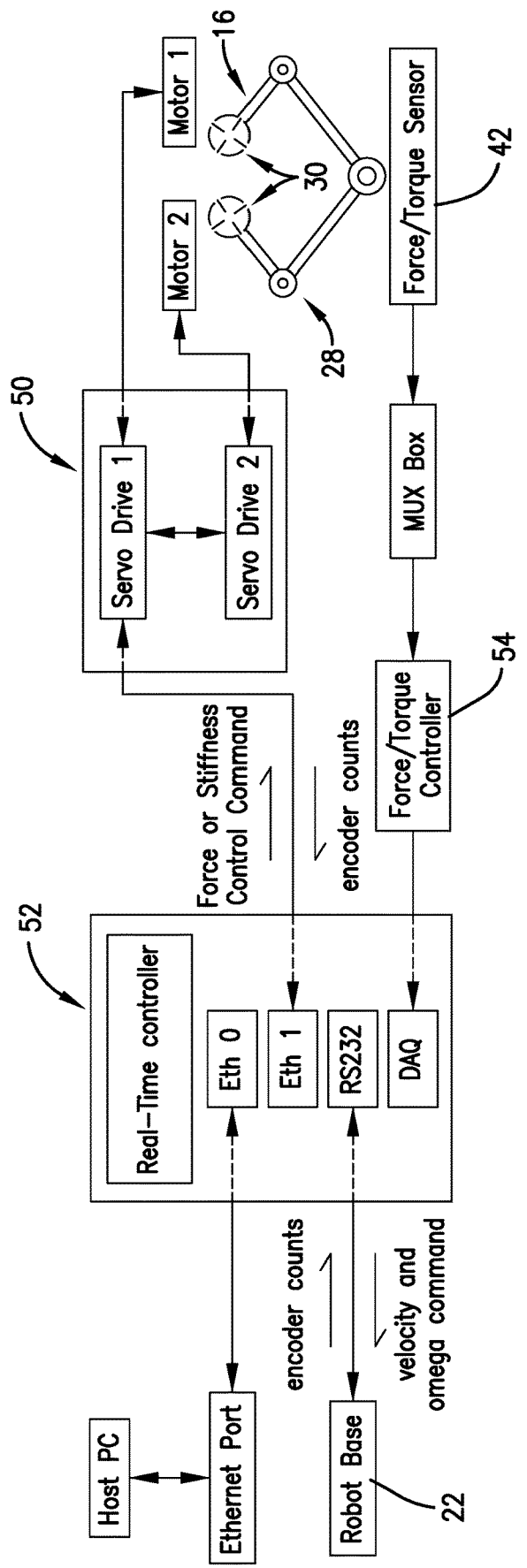
FIG. 5 is a block diagram of example control and communication of components of the mobile robot system of FIG. 1.
Figure 6:
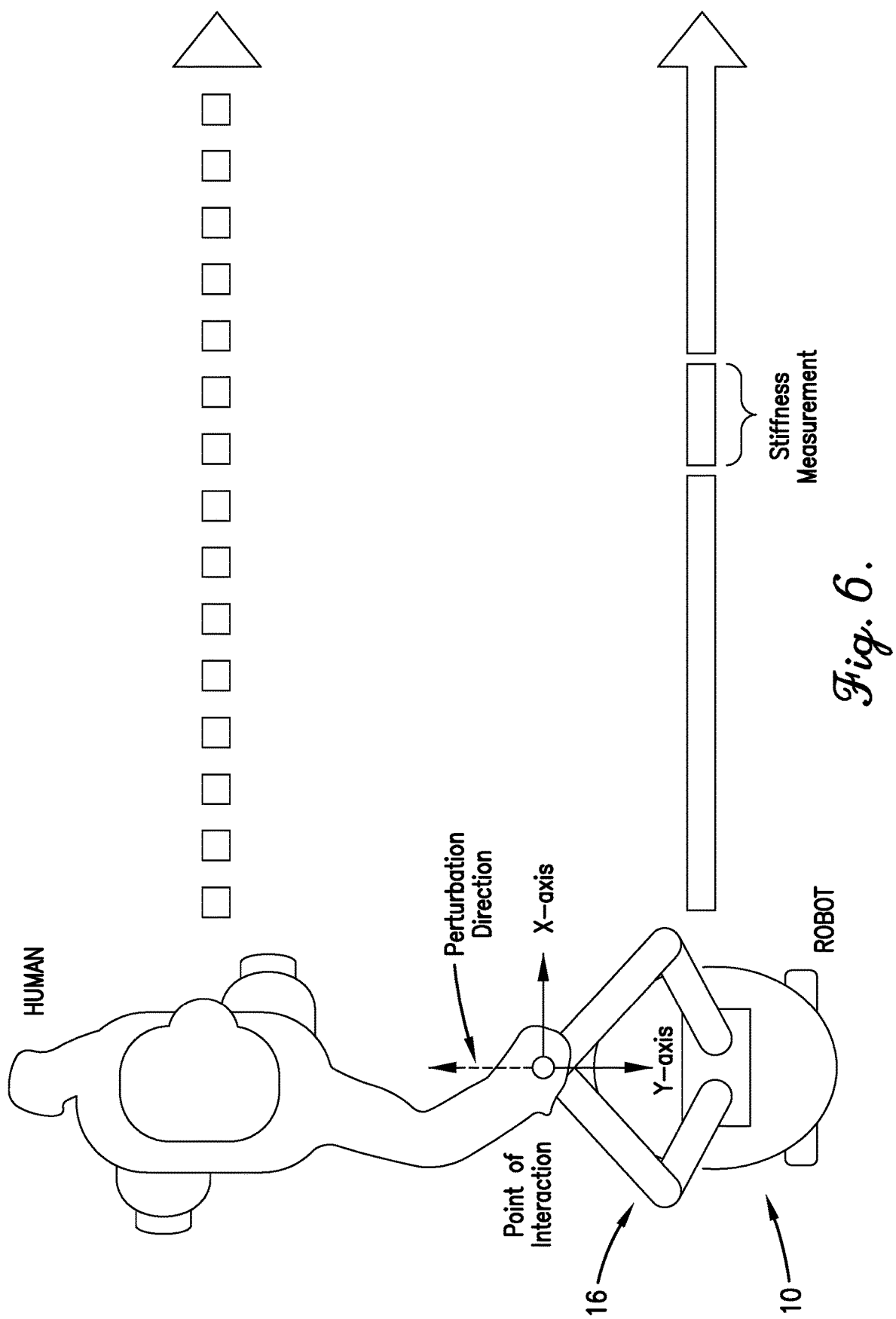
FIG. 6 is a plan view of the mobile robot system of FIG. 1 interacting with the human user during a perturbation event.

As seen in FIG. 5, the main controller 52 may be configured as a central processing unit. For example, the main controller 52 may communicate with the servo drives 50 through a master-slave EtherCAT protocol, and with the base micro-controller 22 through an RS-232 serial communication protocol. It may also accept analog voltage data from the force/torque transducer 42 via the force/torque controller 54. A C-series module may be used to input voltage data to the controller 52. For monitoring the health of the force/torque controller 42, a separate digital input-output module may be used.

The controller 52 may be configured to provide a background stiffness of between fifty Newton/meters and one hundred Newton/meters to the human user via the end effector. The controller 52 may be further configured to determine a stiffness of a human arm of the human user at a particular time by generating a single force perturbation at the handle in a direction of the human user, measuring a displacement of the human arm and measuring a peak velocity achieved by the human arm after the single force perturbation, determining the stiffness of the human arm as a function of the single force perturbation and the displacement of the human arm. The controller 52 may be configured to then control operation of the mobile base and robot arm, including physically supporting the human user, based on the stiffness of the human arm at the particular time.

Data acquisition is of the interaction force at the end effector 32 by the human arm. The forces at the end effector 32 may be measured with respect to the force/torque transducer 42 axis and can be transformed into the robot axis using an appropriate rotation matrix. The positions of the servomotors 30 may be recorded using the encoder 51 associated with each servomotor 30. The point of interaction, which is the end of the manipulator or the handle 44, can be calculated from the positions of the servomotors 30 using forward kinematics of the robot arm 16. The data may be recorded with a sampling rate of, e.g., approximately one kilo-Hertz.

If desired, the arm length, from the shoulder to the hand, may be obtained using a motion capture system. For this purpose, reflective markers may be placed on the hand and on the shoulder. This data can then be processed using available software. The sampling rate may be, e.g., approximately two hundred kilo-Hertz. In one implementation, the data from the robot may be decimated to, e.g., approximately two hundred kilo-Hertz before combining the two data. Then, the angular position provided by the servomotor encoders 51 may be compared with the respective position obtained from motion capture system, which is estimated based on the reflective markers attached to the robot arm 16.

Figure 7:
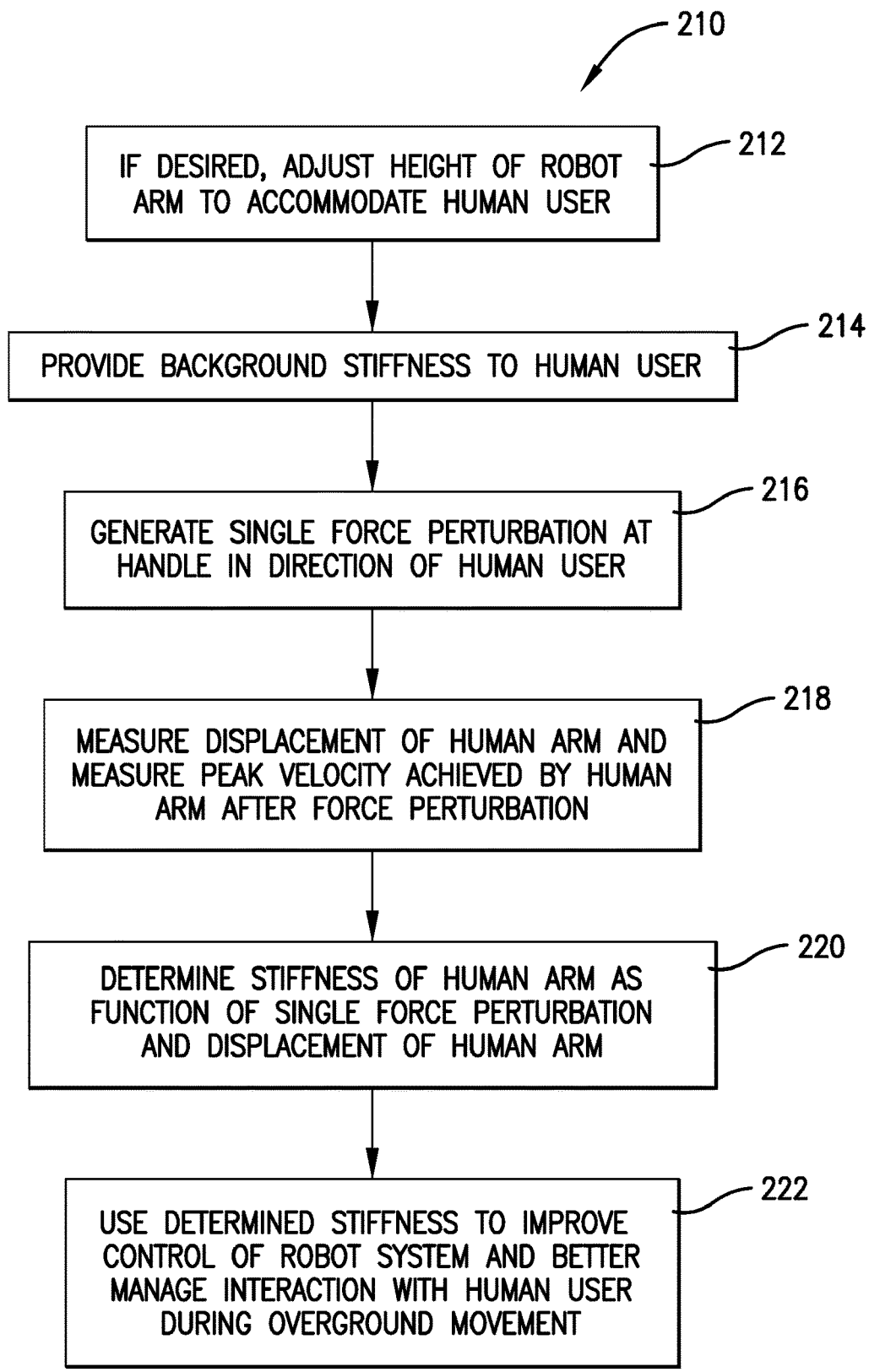
FIG. 7 is a flowchart of steps performed by the mobile robot system of FIG. 1 in order to determine the stiffness of the human arm during overground interaction as the human user grasps the robot and exchanges forces with it as if it was a human partner.

Referring also to FIG. 7, a method 210 is shown for determining the stiffness of a human arm at a particular time during overground interaction as the human user grasps a robot and exchanges forces with it as if it was a human partner. In one implementation, the method 210 may be implemented by and reflect operation of the mobile robot system 10 described above. As shown in step 212, if desired, the height of the robot arm 16 may be adjusted via the robot body 14 such that the interaction handle 44 is aligned with the subject's elbow. As shown in step 214, the robot arm 16 may provide a background stiffness of approximately between fifty Newton/meters and one hundred Newton/meters to the human user via the end effector 32.

As shown in step 216, the robot arm 16 may apply a perturbation of force at the handle 44 in a direction, such as toward the human user, and measure the displacement of the human user's hand. Each determination of stiffness may be based on a single perturbation of force. In one implementation, the robot arm 16 may apply a force perturbation of approximately between one Newton and five Newtons for approximately one second in the axis perpendicular to the robot's movement direction and toward the human user (the −y direction in FIG. 6). During the perturbation, the stiffness control loop may be disabled and replaced by the force controller. The magnitude of the force perturbation may be determined by adding the interaction force due to the background stiffness control when the perturbation was applied and the level of perturbation commanded (for example, approximately between one Newton and five Newtons).

A dynamic model of the human user's arm may be represented as $f=m\ x''+b\ x'+kx$ (1), hereafter referred to as "Equation 1," wherein f is the interaction force and x, x', and x" are the resultant displacement, velocity, and acceleration after the perturbation, respectively, and m, b, and k are the endpoint impedance parameters namely inertia, damping and stiffness, respectively. The displacement of the interaction handle 44 with respect to its position at the onset of the perturbation may be considered to be the resultant displacement due to perturbation. Typically, shortly after the onset of the force perturbation, the hand velocity along the y-direction (seen in FIG. 6) decreases as the hand is pushed away from the robot system 10 until it reaches a negative peak. Then the velocity increases towards the robot system 10 until it passes zero and reaches a positive peak approximately between two hundred fifty milliseconds and four hundred fifty milliseconds after the onset of the perturbation.

As shown in step 218, the robot system 10 may measure a displacement of the human arm and measure a peak velocity achieved by the human arm after the single force perturbation. As shown in step 220, the robot system 10 may determine the stiffness of the human arm as a function of the single force perturbation and the displacement of the human arm.

The data between the onset of the perturbation to the second or positive peak of the velocity of the human arm contains the passive dynamics and can be used to determine the arm stiffness as described by Equation 1 during the overground pHRI. The positive peak may be obtained by taking the time derivative of the displacement data collected by the encoders. The endpoint position, which is also the human hand position, with respect to the robot system 10 may be measured through the encoders on the servomotors 30. Additionally, the interaction force at the endpoint may be measured through the force/torque transducer 42. In one implementation, a second order Butterworth low-pass zero lag filter with forty kilo-Hertz cutoff frequency may be used to filter the recorded force and displacement data in suitable analysis software. The graph of hand velocity versus time may be plotted in analysis software using the filtered data. The second peak on the plot may be identified and the time instant noted. Parameters of Equation 1 may be obtained from the force and displacement data between the onset of the perturbation (time=zero milliseconds) and the time of the second peak (time=between two hundred fifty milliseconds and four hundred fifty milliseconds) using the analysis software function for non-linear regression to estimate m, b, and k. The stiffness value, k, is of primary interest while the inertia and damping values may be used to verify that the regression result is acceptable (for example, both m and b should be positive and realistic).

As shown in step 222, operation of the mobile base and robot arm may then be controlled, including physically supporting the human user, based in part on the determined stiffness of the human arm at the particular time, thereby improving control of the system and better managing interaction with the human user during overground movement.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A mobile robot system comprising:
   a mobile base configured to move with a human user;
   a robot arm coupled with the mobile base and configured to physically interact with the human user, the robot arm including—
      at least one servomotor,
      a linkage mechanism coupled with and driven by the at least one servomotor,
      an end effector including a handle physically supported by the linkage mechanism and configured to be grasped by the human user,
      a force transducer coupled with the end effector and configured to measure a force applied by a human arm of the human user to the handle; and
   a controller configured to—
      determine a stiffness of a human arm of the human user at a particular time by—
         generating a single force perturbation at the handle of at least one Newton in a direction,
         measuring a displacement of the human arm and measuring a peak velocity achieved by the human arm after the single force perturbation,
         determining the stiffness of the human arm as a function of the single force perturbation and the displacement of the human arm, and
      control operation of the mobile base and robot arm, with regard to interacting with human user, based on the stiffness of the human arm at the particular time.

2. The mobile robot system of claim 1, the mobile base including at least one wheel driven by an electric motor.

3. The mobile robot system of claim 1, wherein the servomotor is a brushless direct current motor configured to move the end effector at least between eight-tenths and nine-tenths meters-per-second, and to move the end effector so that the end effector is able to generate a force of at least between nine and eleven Newtons.

4. The mobile robot system of claim 1, there being two servomotors, and the linkage mechanism being a two-dimensional closed loop symmetrical five-link mechanism with two degrees of freedom and formed by two distal links, two proximal links, and a ground link coupled with and driven by the two servomotors, and the handle being located at a joint of the two distal links.

5. The mobile robot system of claim 4, the force transducer being a six-axis force transducer configured to measure forces up to seventeen Newtons, and the force transducer being positioned at the joint of the two distal links with the handle.

6. The mobile robot system of claim 1, the controller further configured to provide a background stiffness of between fifty Newton/meters and one hundred Newton/meters to the human user via the end effector.

7. The mobile robot system of claim 1, further including a robot body extending between the mobile base and the robot arm, the robot body having an adjustable height allowing for adjusting a vertical position of the handle of the robot arm relative to the human user.

8. A mobile robot system comprising:
   a mobile base configured to move with a human user;
   a robot arm coupled with the mobile base and configured to physically interact with the human user, the robot arm including— at least one servomotor including an encoder configured to measure an angular displacement of a rotor of the at least one servomotor,
a linkage mechanism coupled with and driven by the at least one servomotor,
an end effector including a handle physically supported by the linkage mechanism and configured to be grasped by the human user and to provide a background stiffness of between forty and one hundred ten Newtons-per-meter,
a force transducer coupled with the end effector and configured to measure a force applied by a human arm of the human user to the handle; and
a controller configured to—
determine a stiffness of a human arm of the human user at a particular time by—
generating a single force perturbation at the handle of between three and five Newtons in a direction,
measuring a displacement of the human arm and measuring a peak velocity achieved by the human arm between two hundred and five hundred milliseconds after the single force perturbation,
determining the stiffness of the human arm as a function of the single force perturbation and the displacement of the human arm, and
control operation of the mobile base and robot arm, with regard to interacting with the human user, based on the stiffness of the human arm at the particular time.

9. The mobile robot system of claim 8, the mobile base including at least one wheel driven by an electric motor.

10. The mobile robot system of claim 8, wherein the servomotor is a brushless direct current motor configured to move the end effector at least between eight-tenths and nine-tenths meters-per-second, and to move the end effector so that the end effector is able to generate a force of at least between nine and eleven Newtons.

11. The mobile robot system of claim 8, there being two servomotors, and the linkage mechanism being a two-dimensional closed loop symmetrical five-link mechanism with two degrees of freedom and formed by two distal links, two proximal links, and a ground link coupled with and driven by the two servomotors, and the handle being located at a joint of the two distal links.

12. The mobile robot system of claim 11, the force transducer being a six-axis force transducer configured to measure forces up to seventeen Newtons, and the force transducer being positioned at the joint of the two distal links with the handle.

13. The mobile robot system of claim 8, the controller further configured to provide a background stiffness of between fifty Newton/meters and one hundred Newton/meters to the human user via the end effector.

14. The mobile robot system of claim 8, further including a robot body extending between the mobile base and the robot arm, the robot body having an adjustable height allowing for adjusting a vertical position of the handle of the robot arm relative to the human user.

15. A mobile robot system comprising:
a mobile base configured to move with a human user, the mobile base including at least one wheel driven by an electric motor;
a robot arm coupled with the mobile base and configured to physically interact with the human user, the robot arm including—
at least one servomotor,
a linkage mechanism coupled with and driven by the at least one servomotor,
an end effector including a handle physically supported by the linkage mechanism and configured to be grasped by the human user, and
a force transducer coupled with the end effector and configured to measure a force applied by a human arm of the human user to the handle;
a controller configured to—
provide a background stiffness of between fifty Newton/meters and one hundred Newton/meters to the human user via the end effector,
determine a stiffness of a human arm of the human user at a particular time by—
generating a single force perturbation at the handle in a direction of the human user,
measuring a displacement of the human arm and measuring a peak velocity achieved by the human arm after the single force perturbation,
determining the stiffness of the human arm as a function of the single force perturbation and the displacement of the human arm, and
control operation of the mobile base and robot arm, with regard to interacting with the human user, based on the stiffness of the human arm at the particular time; and
a robot body extending between the mobile base and the robot arm, the robot body having an adjustable height allowing for adjusting a vertical position of the handle of the robot arm relative to the human user.

16. The mobile robot system of claim 15, wherein the servomotor is a brushless direct current motor configured to move the end effector at least between eight-tenths and nine-tenths meters-per-second, and to move the end effector so that the end effector is able to generate a force of at least between nine and eleven Newtons.

17. The mobile robot system of claim 15, there being two servomotors, and the linkage mechanism being a two-dimensional closed loop symmetrical five-link mechanism with two degrees of freedom and formed by two distal links, two proximal links, and a ground link coupled with and driven by the two servomotors, and the handle being located at a joint of the two distal links.

18. The mobile robot system of claim 17, the force transducer being a six-axis force transducer configured to measure forces up to seventeen Newtons, and the force transducer being positioned at the joint of the two distal links with the handle.

* * * * *